United States Patent
Wey

(10) Patent No.: US 7,768,498 B2
(45) Date of Patent: Aug. 3, 2010

(54) COMPUTER INPUT DEVICE TRACKING SIX DEGREES OF FREEDOM

(75) Inventor: Fun Wey, Singapore (SG)

(73) Assignee: Wey Fun, Singapore (SG)

( * ) Notice: Subject to any disclaimer, the term of this patent is extended or adjusted under 35 U.S.C. 154(b) by 1278 days.

(21) Appl. No.: 11/293,442

(22) Filed: Dec. 2, 2005

(65) Prior Publication Data

US 2006/0082546 A1    Apr. 20, 2006

Related U.S. Application Data

(63) Continuation-in-part of application No. PCT/SG2004/000175, filed on Jun. 10, 2004.

(30) Foreign Application Priority Data

Jun. 23, 2003    (SG) .............................. 200303589-6

(51) Int. Cl.
    *G09G 5/00*    (2006.01)
(52) U.S. Cl. ..................... 345/156; 345/157; 345/419
(58) Field of Classification Search ......... 345/156–157, 345/419
    See application file for complete search history.

(56) References Cited

U.S. PATENT DOCUMENTS

| | | |
|---|---|---|
| 4,662,752 A | 5/1987 | Tucker et al. |
| 4,672,562 A | 6/1987 | Egli et al. |
| 4,761,000 A | 8/1988 | Fisher et al. |
| 4,811,608 A | 3/1989 | Hilton |
| 5,045,843 A | 9/1991 | Hansen |
| 5,128,671 A | 7/1992 | Thomas, Jr. |
| 5,146,566 A | 9/1992 | Hollis, Jr. et al. |
| 5,212,888 A | 5/1993 | Cary et al. |
| 5,222,400 A | 6/1993 | Hilton |
| 5,227,985 A * | 7/1993 | DeMenthon ................ 702/153 |
| 5,230,623 A | 7/1993 | Guthrie et al. |
| 5,297,061 A | 3/1994 | Dementhon et al. |
| 5,335,557 A | 8/1994 | Yasutake |
| 5,446,798 A | 8/1995 | Morita et al. |
| 5,672,820 A | 9/1997 | Rossi et al. |
| 5,856,844 A | 1/1999 | Batterman et al. |
| 5,889,505 A | 3/1999 | Toyama et al. |
| 6,172,354 B1 | 1/2001 | Adan et al. |
| 6,417,836 B1 * | 7/2002 | Kumar et al. ................ 345/156 |
| 6,720,949 B1 | 4/2004 | Pryor et al. |

FOREIGN PATENT DOCUMENTS

EP    0516862 A1    2/1992

* cited by examiner

*Primary Examiner*—Richard Hjerpe
*Assistant Examiner*—Leonid Shapiro

(57) ABSTRACT

An input device with three-dimensional, six-degrees-of-freedom data input for a computer having a tracker with an array of tracking points defining a first axis and a second axis or plane is described. Light reflected from, or given off from the tracking points, is captured by a camera. From the two-dimensional images captured, three-dimensional data relating to the position and orientation of the input device may be obtained from the relative positions of the tracking points by a provided algorithm and lookup table. The use of one of the tracking points as an on-off indicator of the tracker's orientation towards or away from the camera greatly expands the use of such technology from limited hemispherical tracking to all-round, full-spherical tracking. In the preferred embodiment of the invention, tracking points on the input device which is in the form of a planar "T"-shape wand with a cross piece and a camera allow computer users to input natural swinging movements into a virtual environment for gaming or other three-dimensional applications.

14 Claims, 6 Drawing Sheets

COMPUTER INPUT DEVICE TRACKING SIX DEGREES OF FREEDOM

CROSS-REFERENCE TO RELATED APPLICATIONS

This application is a continuation-in-part of International Application No. PCT/SG2004/000175, filed Jun. 10, 2004, which claims the benefit of Singapore Application No. 200303589-6, filed Jun. 23, 2003.

FIELD OF THE INVENTION

The present invention relates to computer input devices.

In particular, this invention relates to a computer input device having a plurality of tracking points and a camera to allow entry of three-dimensional (3D), six-degrees-of-freedom data into a computer or gaming device.

BACKGROUND OF THE INVENTION

At present, the main input devices for computers are the keyboard and a pointer device commonly called a "mouse". For computer gaming purposes, additional devices such as joysticks and gaming consoles with specialized buttons are available to give more input choices to the user in the game's virtual environment. However, these are two-dimensional input devices used for entering 3D information. More recently, "computer interface apparels" such as gaming gloves, actually worn by gamers, are used to input their choice of movements into the computer games.

Despite this plethora of input devices, no satisfactory device exists to accept the desired movements in sword fighting, or racket, club or bat-swinging movements for certain computer games. Other possible applications include symphony-conducting baton movements or the waving of a "magic wand" to perform magical tricks in games. The combined use of cursor control keys and rolling of trackballs do not satisfactorily convey the user's intended movements for the virtual object or character he controls in some computer games.

In addition, other applications beyond the realm of computer games such as computer-aided design and computer-aided manufacturing (CAD/CAM) work, require three-dimensional (3D) input when modifying 3D renditions of designs. Current input devices do not allow ease of use of such applications.

In recent years there have been plethora of technologies being developed and marketed to achieve such 3D, six-degrees-of-freedom (6-DOF) tracking. These include magnetic field-based trackers, ultrasonic mouse, accelerometer/gyro-based trackers, and technologies based on pull-strings and mechanical linkages. However all these technologies require expensive components, difficult to setup and operate, some of which require extensive preparation of operating environment to avoid interference, and are thus not generally available for consumer market.

Beside these technologies, there have been attempts to use machine-vision based technology to achieve 3D/6-DOF tracking using low-cost, commonly available digital cameras that could input real-time images to computers. Such technologies generally require putting a predefined cluster of light sources as tracking points onto the object to be tracked, and from the projected image of these tracking points in the camera the provided algorithms would perform the 3D reconstruction process to recover the position and orientation of the object being tracked. Many of these machine-vision based techniques involve using at least two cameras. An example can be found in U.S. Pat. No. 6,720,949 which uses stereo photogrammetry. However the high cost of using multiple cameras could be avoided if the configuration of the tracking points are properly designed such that the image captured by only one camera could provide unambiguous information about the pose of the object being tracked.

An example of such an input device is described in U.S. Pat. No. 5,889,505 entitled "Vision-Based Six-Degrees-of-Freedom Computer Input Device" and issued to Toyama et. al. The position and orientation of this input device are determined by tracking a physical object suspended by cables as it is moved by a user. The tracking mechanism requires either an initialization where the tracked mechanism is first imaged in a "home position", or a comparison of current data to previously stored data. The Z coordinate is measured by computing how far apart the pixels of the tracked object are from its centroid. Thus, this method includes all the pixels of the tracked object in its Z computation. Another problem with this approach is that it computes orientation by tracking two reference points that have different distinguishing characteristics. In other words, these reference points must be visually distinguishable. Yet another drawback of this approach is that it does not provide absolute values for the rotation and translation parameters, but only values that are proportional to the actual quantities. These values must then be scaled before being used to control applications.

U.S. Pat. No. 5,856,844, issued to Batterman et al. and entitled "Method and Apparatus for Determining Position and Orientation," describes a method for determining the six degrees of freedom of a head mounted display and a handle to which an optically-modulated target is attached. The target is marked with squares on its surface, and by tracking the perspective views of these squares, six degrees of freedom are computed. A problem with this approach is that it requires a special orientation mark in the optically-modulated target, in order to identify the ordering of the squares. Another problem is that this approach determines rotation angles directly, and is therefore unduly prone to noise-related distortions.

Techniques described in U.S. Pat. No. 5,227,985, issued to DeMenthon and entitled-"Computer Vision System for Position Monitoring in Three Dimensions Using Non-Coplanar Light Sources Attached to a Monitored Object," and U.S. Pat. No. 5,297,061, issued to DeMenthon et al. and entitled "Three Dimensional Pointing Device Monitored by Computer Vision," determine position and orientation of an object by utilizing a set of non-coplanar light sources mounted on the object. A problem with this approach is that the use of non-coplanar light sources makes the device more difficult to manufacture and therefore more costly. Another problem is that the light sources used in this approach are of different sizes, in order to correctly identify the ordering of the light sources in the corresponding image, which adds additional complexity to the device. This requirement would also become problematic if the tracker is positioned very close to the camera, especially if wide-angle lens is used, as the perspective projection would cause the projected images of the light sources out of proportion and thereby making the comparison of their actual sizes very difficult. The use of large-size light sources would also reduce the resolution of the tracking and increases the occurrence of light sources' overlapping. Moreover this approach is capable of only hemispherical tracking, as the algorithm would not be able resolve, without assuming that the device only need to operate for one-half of the full sphere of tracking, the ambiguity that any unique light sources' projection can be the result of at least two very distinct tracker's states. This limitation can also be easily deduced from the preferred embodiment described in U.S. Pat. No. 5,297,061, which involves using tips of optical fibers as the light sources. Such arrangement would allow the light sources to be observable in the camera only if they are oriented towards it. Its function is thus limited to being a pointing device as spelt out in the invention's title.

U.S. Pat. No. 4,672,562, issued to Egli et al. and entitled "Method and Apparatus for Determining Location and Orientation of Objects," describes an input device comprising an orthogonally-related target array. The points are arranged in a very specific configuration such that the fourth target point forms a common intersection point of first, second and third line projections passing separately through the first three points and intersecting the fourth point. In addition, these line projections must form three right angles at the fourth target point. Such constraints are generally undesirable in that they can render the device difficult to manufacture and use. It is also computationally expensive to online-reconstruct the 3D/six-DOF information using the vector replicas' approach. The device is also limited to hemispherical tracking even if the tracked object is transparent, as the configuration would not allow the algorithm to distinguish if the tracked surface is facing towards or away from the camera.

More recently, U.S. Pat. No. 6,417,836, issued to Kumar et al. and entitled "Computer Input Device Having Six Degrees of Freedom For Controlling Movement of a Three-Dimensional Object", describes an input device comprising a handle with a plate attached to an upper portion thereof. Associated with an upper planar portion of the plate is a set of at least five principle lighting sources. This device is capable of providing only hemispherical tracking as the light sources will not be visible to the camera if the upper planar portion of the plate is oriented away from it. The computation involved in the 3D reconstruction process is also expensive as it involves much online equation-solving for finding the three-dimensional positions of all the lighting sources first prior to finding the orientations. Moreover the device's design is not ergonomic for most gaming purposes and cannot be handled as a stick-like manipulator, which is the common shape of most virtual arsenals used in electronic games.

In view of the above, a need clearly exists for an intuitive, ergonomic and low-cost input device that enables representation and input of 3D movements by users into computer and gaming devices, while also avoiding the problems associated with the conventional approaches, particularly on the points regarding limited hemispherical tracking, lack of ergonomics as a gaming device, non-coplanar configuration, and complexity in online computations required in the reconstruction process.

SUMMARY OF THE INVENTION

The present invention seeks to provide an improved input device that is capable of tracking three-dimensional, six-degrees-of-freedom positions, coding the tracking result into digital data and inputting it into a computer in real time, said input device has a handheld tracker comprising an arrangement of one array of tracking points to define a first axis, a second array of tracking points to define a second axis or plane orthogonal to the first axis, with distances between the tracking points carefully selected such that a two-dimensional image of the tracking points captured by a camera can be used by a processor to determine the position and orientation of the input device in three-dimensional space using a provided algorithm. Another consideration for the determination of distances between tracking points is the span of anticipated movement of the tracker within the view volume of the camera versus the resolution of the imaging sensor. At least one tracking point is embedded within the tracker's body in such a way that its presence or absence in the captured image within the camera is used to determine whether the tracker is oriented towards or away from the camera.

Accordingly, in one aspect, the present invention provides an input device comprising a "T"- or "L"-shape tracker wand with a reference spine plus a cross piece, both reference spine and cross piece having a plurality of active tracking points, at least one camera, and at least a processor. It also has an ergonomically designed pen-like handle that allows the user to comfortably grip it for manipulation. One of the tracking points is embedded within the wand's handle such that it is only partially observable, so that its presence or absence in the captured image within the camera provides the cue of whether the wand is oriented towards or away from the camera. By mounting a proper optical bandpass filter in the camera's lens, these tracking points would be captured by the camera and appear as bright spots on its imaging plane while the background scene would be blocked out.

In accordance with the invention, the driver software determines the corresponding label for each of the bright spots in the image solely from their relative 2D positions, and then extracts simple 2D geometrical data such as lengths and angles between some of the lines that connect these bright spots in certain ways. With these 2D geometrical data it then directly reads essential parameters from a pre-computed lookup table for completing the reconstruction process determining the 6-DOF data of the tracker. These 6-DOF data are then sent to other processes running in the computer for re-producing the tracker's position and orientation on a virtual object in the virtual environment.

The present invention has numerous significant improvements and advantages over the previously described conventional approaches. The most significant of these is that the invention uses four tracking points that are observable from all directions for the 3D/6-DOF hemispherical tracking, and together with the use of the presence or absence of a fifth tracking point to resolve whether the hemisphere of tracking is the one facing towards or away from the camera. In this way the device is capable of providing more than hemispherical, even nearly full-spherical/all-round tracking with just five tracking points and using just one camera.

Another very distinctive advantage is that the minimal configuration of the tracker wand allows the full 3D/6-DOF reconstruction to be carried out with fast extraction of simple 2D features in the projected image of the tracking points, followed by fast fetching of approximate solution from offline-computed, small-size lookup table with little online equation-solving. Such use of lookup table in this invention efficiently puts the major bulk of required processing to offline computations and greatly reduces the need for online computations, thereby resulting in extremely fast reconstruction process using very little computational resources. The use of such minimal number of tracking points also minimize the occurrence of their overlapping, and greatly simplify the driver software's requirement on exceptions' handling when overlapping occurs.

All the tracking points are not required to be distinguishable from each other by their sizes or other properties, as only their relative positions in the image are required for the algorithm to label them prior to the reconstruction. This implies that small-size but bright tracking points could be used to improve the resolution and accuracy of tracking, as well as minimizing the occurrence of overlapping.

The tracker wand can be conveniently handled like a pen or stick and allows ergonomic handling and manipulation for gaming purposes, as holding and swaying it are perceptually similar to holding and swaying a miniaturized sword, bat or racket. Its flat "T"- or "L"-shape is also entirely planar for easy storage and handling.

BRIEF DESCRIPTION OF THE DRAWINGS

A preferred embodiment of the present invention will now be more fully described, by way of example, with reference to the drawings of which.

DETAILED DESCRIPTION OF THE INVENTION

A detailed description of the present invention will now be given in accordance with a preferred embodiment of the invention. In the following description, details are provided to describe the preferred embodiment. It shall be apparent to one skilled in the art, however, that the invention may be practiced without such details. Some of these details may not be described at length so as not to obscure the invention.

It is an object of the present invention to provide an input device for computer and gaming devices that accept 3D input. Such device is capable of providing nearly full-spherical, all-round tracking within its operating volume.

It is another object of the present invention to provide an input device for computer and gaming devices that allow the reproduction of intended 3D, 6 DOF movements of virtual objects in the virtual environment. This type of movement input may be performed with minimal processor demands so that the present invention can be used in simpler, smaller or less expensive computers and gaming devices and not require too much processor resources from other concurrently-running processes.

The terms "computer" and "gaming devices" include, but are not limited to, any computing device that require 3D input such as CAD/CAM workstations, "personal computers", dedicated computer gaming consoles and devices, personal digital assistants, and dedicated processors for processing images captured by the present invention.

The invention includes a handheld tracker comprising a first array of tracking points to define a first axis, a second array of tracking points to define a second axis or plane orthogonal to the first axis, with the distances between the points carefully selected such that a two-dimensional image of the tracking points can be used to determine the position and orientation of the input device in three-dimensional space.

Figure 1:
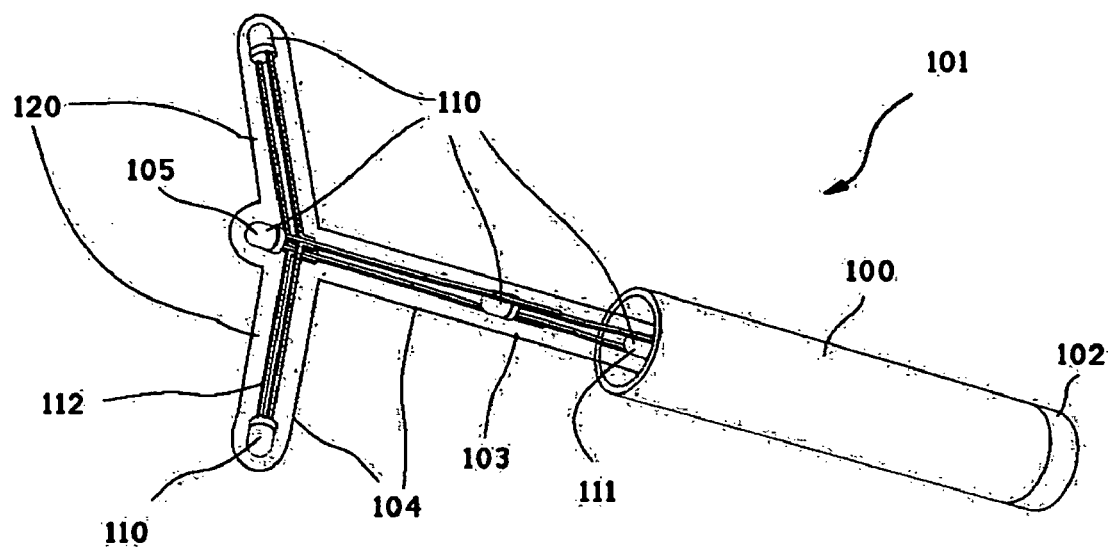
FIG. 1 illustrates the details of an embodiment of the tracker wand of the present invention.

Referring now to FIG. 1, an embodiment in accordance with the present invention is illustrated. The array should not be seen to be limited to the embodiments described. One element of the preferred embodiment of the present invention is the input device is the wand 101, a longitudinal device that is substantially straight having a handle 100, a reference spine 103 and a cross piece 120. The user manipulates the wand by grasping it substantially at the handle 100.

The cross piece 120 is orthogonally disposed near the tip of reference spine 103. In the preferred embodiment, the cross piece 120 is substantially straight such that it forms a plane with the longitudinal axis of the wand 101, although cross pieces in the shape of the letter "L" or in form of triangles or polygons may also be used.

Disposed on the wand 101, on its reference spine 103, is a first plurality of tracking points. A second plurality of tracking points is also disposed on the cross piece 120. These tracking points 110 may be active light emitters or passive light reflectors.

The wavelengths of light usable range from infrared, through visible light to ultra-violet light.

In the preferred embodiment, the tracking points 110 are active Infrared-Emitting Diodes (IREDs) with their electricity-conducting connectors 112 soldered together and formed a "T" arrangement, as shown in FIG. 1. These IREDs are specially prepared so that their emissions are all-spherical instead of forward-cone as they are originally designed for. One method to achieve this is to coat them with a layer of suitable pigment such as acrylic or enamel paint. This would make the emissions from the tracking points 110 observable by the camera 130, an element of the present invention, regardless of how the wand 101 is oriented as long as they are not obscured and are within the field and range of view of the camera 130. The exception is the fifth tracking point 111 nearest the handle 100 which is positioned inside the handle 100 in a manner such that it can be captured by the camera 130 only when its forward hemisphere is facing towards the camera 130. These IREDs are powered by one or more batteries stored in the handle 100, which has a switch at its bottom end 102 for turning the power on or off. The IREDs and their connectors 112 in the reference spine 103 and the cross piece 120 are overmolded with a layer of transparent plastic coating 104 for reinforcing the structure and protecting the IREDs. For most desktop applications, the wand 101 is no more than 20 cm long, a length that caters to a wide range of users. There are two tracking points at either end of the cross piece 120 which is preferably about 6 cm long. Note that the tracking point on the reference spine furthest from the handle 100 is not necessarily in collinear arrangement with these two tracking points on the extremes of the cross piece 120, although it is more desirable to be so as this would reduce the complexity of computations for the reconstruction process.

In the case where the tracking points 110 are passive light reflectors, their shapes should be that of a globe or ball to maximize retro-reflection of light back at the direction where it comes from. The exception is the fifth tracking point 111 embedded in the handle 100. Instead of being in a globe or half globe shape, this tracking point is only slightly domed. A lighting mean 150, preferably co-axially mounted beside the camera's lens 140, is required to illuminate the tracking points 110 (FIG. 2).

Another method of supplying light source to the tracking points is by channeling the light from a single main source housed in the handle, through optic fibers to the respective tracking points' sites, and then have the light dispersed through spherical diffusers that are attached to the terminals of the optic fibers.

Figure 2:
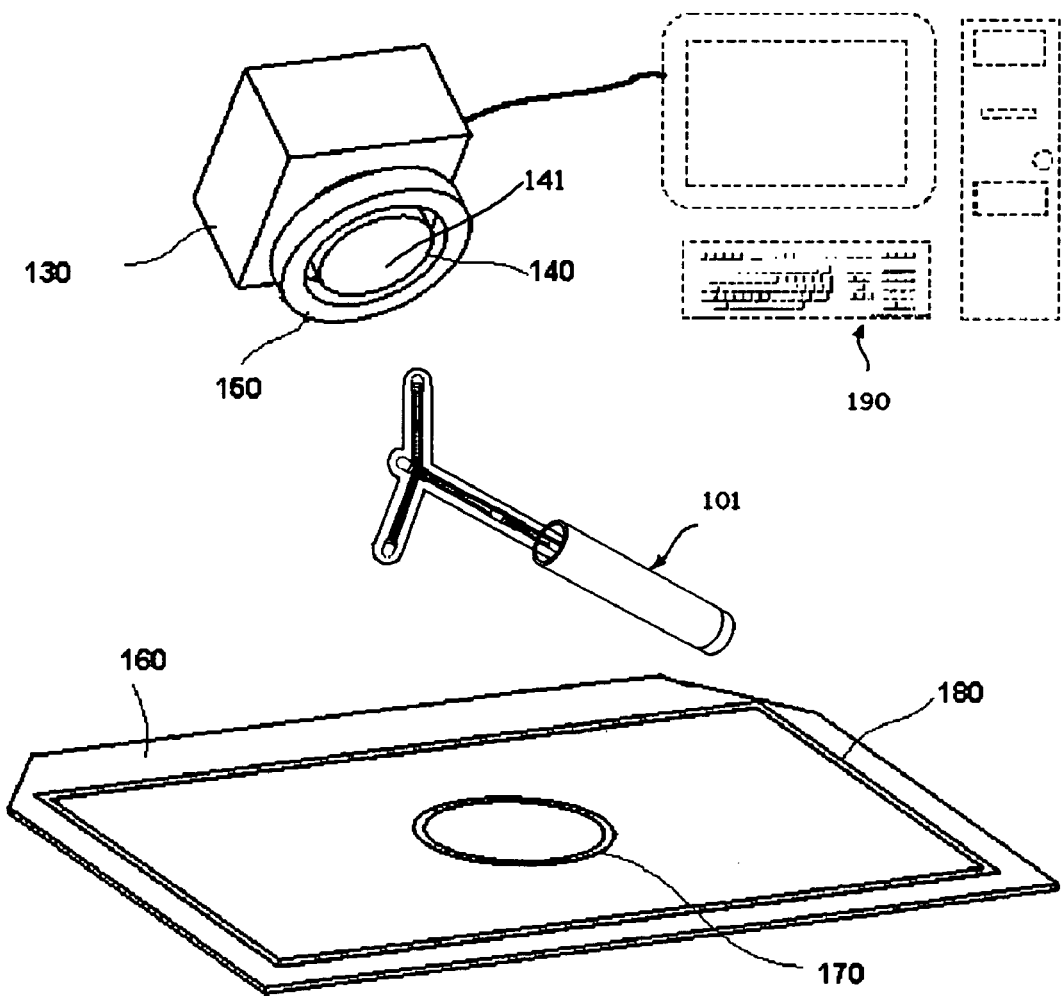
FIG. 2 illustrates an embodiment of the main components of the present invention.

Other elements of the present invention include at least one suitable imaging device 130 such as a digital camera with complementary metal oxide semiconductor (CMOS) or charge-coupled device (CCD) sensors (FIG. 2). In the preferred embodiment, one camera 130 is used and it is connected to a processor 190, sending captured images to the processor 190 in real-time with trivial time lag. The camera's lens 140 has an Infrared-pass filter 141 mounted in front of it such that only the infrared light within the narrow band of the IREDs would pass through, and the background scene would be blocked out from the image 300. Hence only the tracking points 110 would appear in the image 300 as bright spots 301 in a dark background.

In operation, the user grasps the handle 100 of the wand 101 of the present invention and wields it as if he is handling the virtual device of choice. The light from tracking points 110 is captured as bright spots 301 by the camera 130. The camera 130 then in turn transmits the image 300 to the processor 190.

The present invention works within the field of view and in line of sight of the camera 130. Thus, the ideal position for the camera 130 is in close proximity to the display screen of the computer or gaming device with the camera 130 pointed substantially at the volume of space in which the user desires to wield the wand 101.

To help the user remain in this volume of space covered by the field of view of the camera 130, a pad 160 with a border marking 180 may be used to help the user estimate the field of view of the camera 130. A circle 170 marked in the center of the pad 160 helps the user to center the wand 101 at the start of the application or game. The surface material of the pad 160 is also selected to minimize reflection of the light used.

Figure 3:
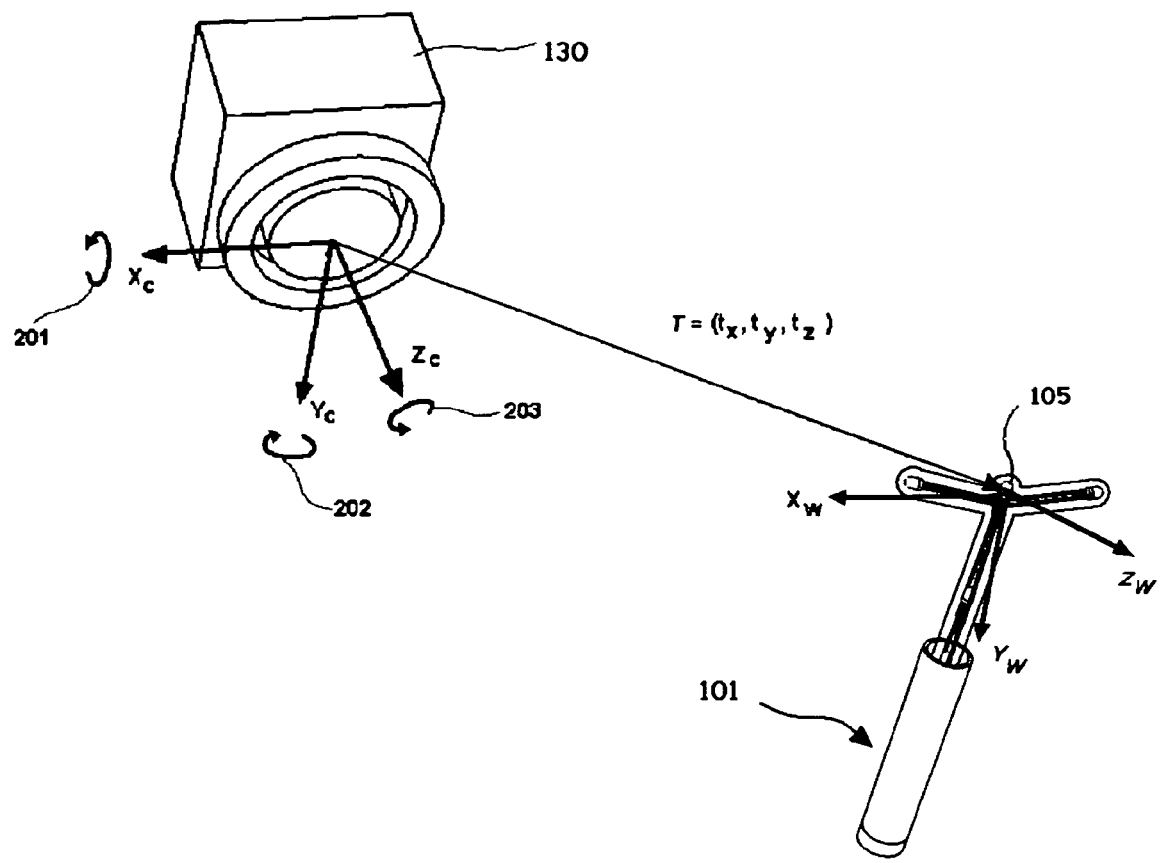
FIG. 3 shows the translation and orientation of the wand from the original condition in which its frame of reference coincides with the camera's frame of reference.

All transformation parameters relating to the wand's position (translation $T=(t_x, t_y, t_z)$) and orientation such as pitch 201, roll 203 and yaw 202 are expressed with respect to the frame of reference of the camera 130 ($X_c, Y_c, Z_c$) (FIG. 3).

The wand's frame ($X_w, Y_w, Z_w$) is assumed to be aligned with the camera's frame ($X_c, Y_c, Z_c$) as an original condition. Any point on the wand $w=(x, y, z, 1)$ is transformed to another point $w'=(x', y', z', 1)$ in the camera's space by the following "XYZ fixed angle" transformation:

$$w'=T+R_zR_yR_xw$$

where
$R_x$ is the pitch rotation matrix about the $X_c$ axis;
$R_y$ is the yaw rotation matrix about the $Y_c$ axis and
$R_z$ is the roll rotation matrix about the $Z_c$ axis The positions of the bright spots 301 in each captured image 300 are used by the accompanying algorithm of the present invention to reconstruct the position and orientation of the wand 101 at each time interval. They provide information such as the distance between the cross piece's two tracking points $d_1$ (the value of which is indicated by the line 323 in FIG. 4) and the distance between the two tracking points $d_2$ of the wand 101 nearest the cross piece 120 (the value of which is indicated by the line 322 in FIG. 4).

Figure 4:
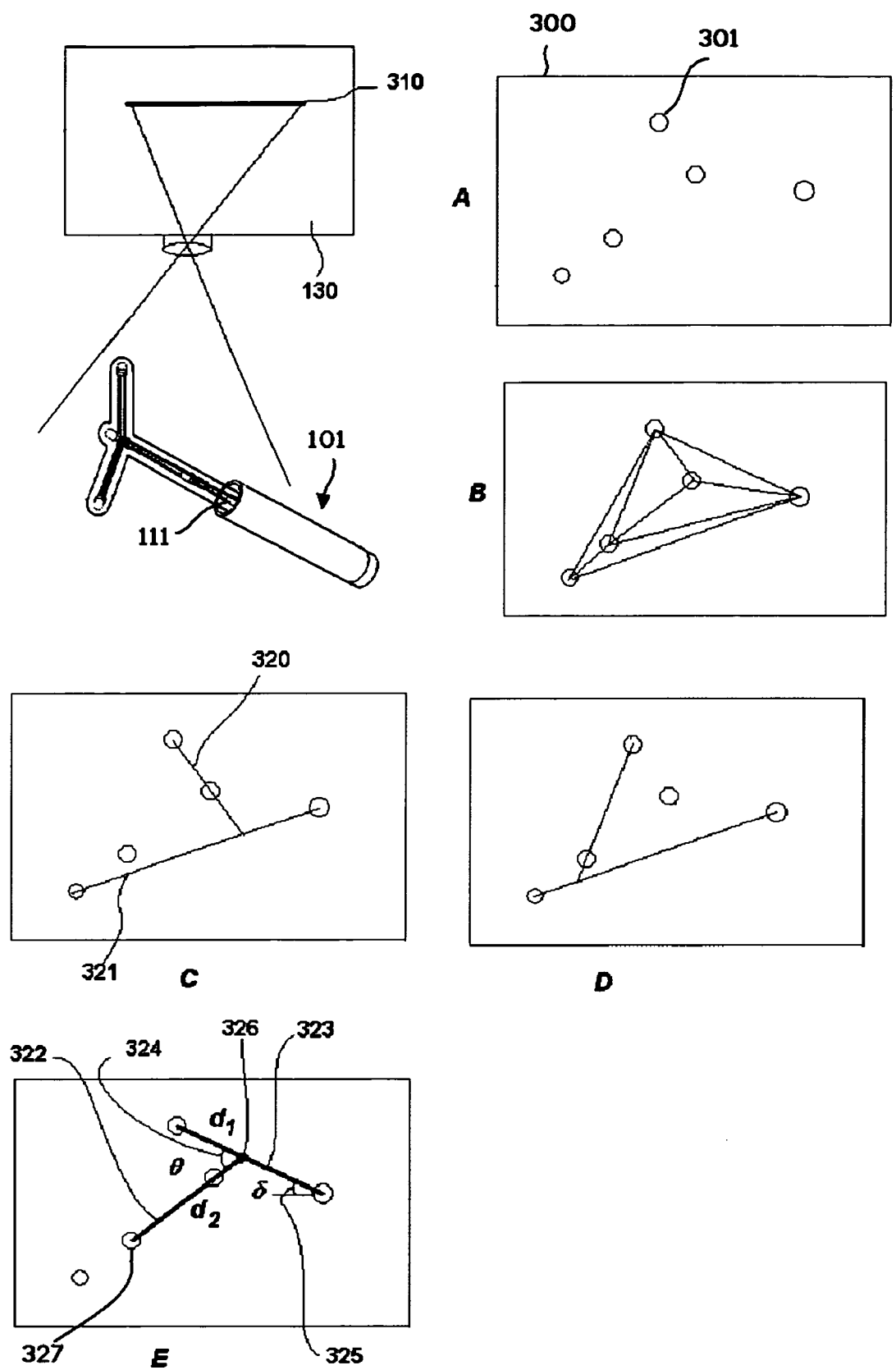
FIG. 4 illustrates, with the wand's fifth tracking point within the line-of-sight of the camera and hence five spots appearing on the image, how the two main axes of the wand is determined in the iterative process of the algorithm of the present invention.

The algorithm of the present invention is capable of performing the 3D/6-DOF reconstruction with a minimum of four tracking points 110. Depending on whether the wand 101 is oriented towards or away from the camera 130, the fifth tracking point 111 may or may not be captured by the camera 130. FIG. 4 illustrates a case where the wand 101 is oriented towards the camera 130 such that the fifth tracking point 111 is within the line-of-sight of the camera 130, and thus there are five spots 301 appearing in the image 300 in the camera's imaging plane 310 as shown in FIG. 4A.

Figure 5:
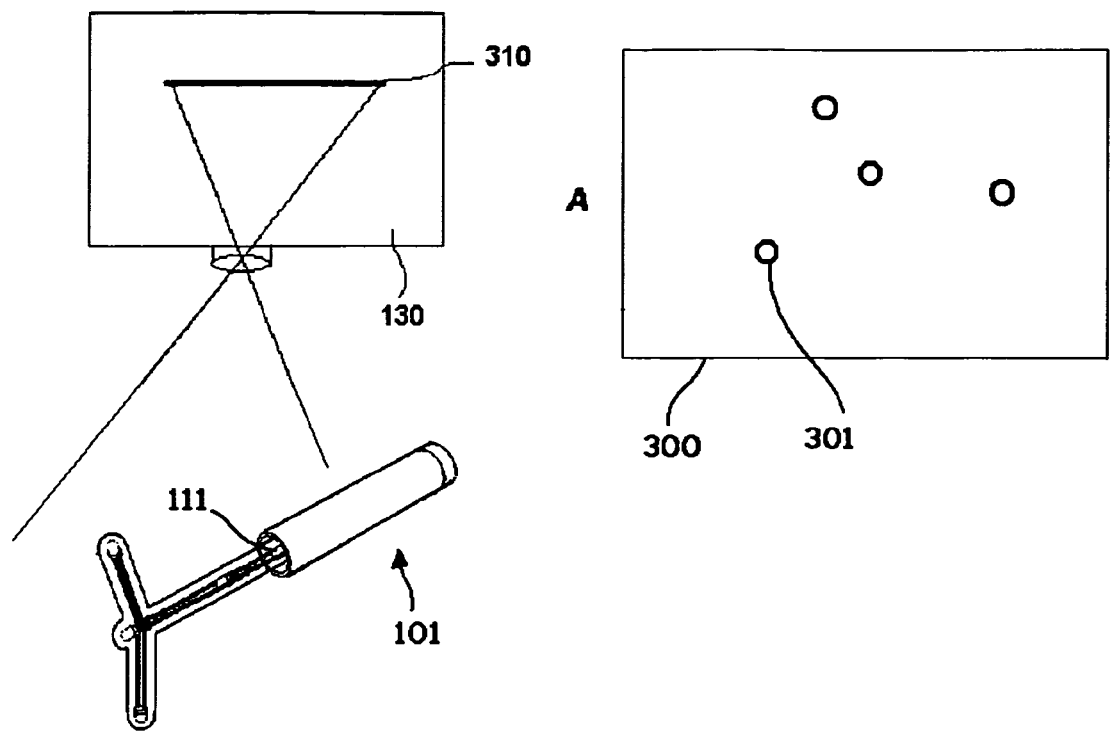
FIG. 5 illustrates the wand's fifth tracking point's forward hemisphere facing away from the camera and hence there are only four spots appearing on the image (FIG. 5A)

FIG. 5 illustrates a case where the wand 101 is oriented away from the camera 130 such that the fifth tracking point 111 is not within the line-of-sight of the camera 130, and thus there are only four spots 301 appearing in the image 300 as shown in FIG. 5A.

The four or five bright spots 301 present in the captured image 300 are used by the algorithm of the present invention to determine the longitudinal axis and the included angle θ 324 as illustrated in FIG. 4.

FIG. 4A shows an example of the image 300 of the five tracking points 110 in 3D space captured by the camera 130 as five bright spots 301 in 2D representation. There are ten possible lines for joining any two spots 301 (FIG. 4B) in this case. If there were only four spots 301, then there would be only six possible lines joining any two spots 301.

The algorithm will begin by comparing a first (320 in FIG. 4C) of these ten possible lines with another of the other nine possible lines to determine if the first line 320 bisects the other line 321 (FIG. 4C). This process is repeated (an unsuccessful example is shown in FIG. 4D) until such two lines that best-fit this relationship are found (FIG. 4E). Thus, the line 322 that bisects another line is the longitudinal axis of the wand. The line 323 being bisected is the line defined by the tracking points 110 of the cross piece 120, i.e. its axis.

When these two axes have been identified by the algorithm, the intersection of the two axes defines the position of the reference origin 105 on the wand 101 (FIG. 1). This is represented by the position 326 on the captured image 300. The wand's design could be in the form such that the reference origin 105 coincides with the centroid of the tracking point at the middle of the cross piece 120 as shown in FIG. 1, or just an arbitrary point not physically designated by any of the tracking point.

In addition, the included angle θ of these two axes as well as the ratio of $d_1$ and $d_2$ as captured by the camera 130 can also be determined. From line 323 and the x-axis of the image, δ (325 in FIG. 4E), the angle formed by the projected axis of the cross piece with the horizontal axis of the image can also be determined. The degree of roll can then be directly assigned by the angle δ.

Concomitantly, the translations $t_x$ and $t_y$ can be directly interpreted from the position of the wand's reference origin 326 in the captured image 300.

The last bit information required is whether the fifth tracking point 111 on the wand 101 can be seen in the captured image 300. This information is represented by the Boolean $P_5$ which is true when the point is present and false when the point is absent.

Once these essential parameters are known, essential portion of the wand's position and orientation may then be reconstructed or obtained from information stored in a prepared lookup table that performs the mapping:

$$<\theta, d_1/d_2, P_5> \rightarrow <\text{pitch}, \text{yaw}, l_l, l_u>$$

where $l_l$ and $l_u$ are the projected distances of either:
a. the two tracking points of the cross piece, if $d_1/d_2 \geq 1$; or
b. the distance of the fourth tracking point 327 on the wand 101 from the wand's projected origin 326, if $d_1/d_2 < 1$;

in the captured image 300 when the wand's origin is at distances from the camera 130 at the lower limit $z_l$ and the upper limit $z_u$ respectively, of the usable operating range from the camera 130, and where the wand's 101 orientation is at the specific pitch and yaw given in the mapping above.

The usable operating range thus defined is important as the lookup table has been generated based on this usable operational range from the camera 130. The usable operational range do not limit the present invention as the operating range can be varied and scaled to different applications with accompanying lookup tables. For most desktop applications, the two limits $z_l$ and $z_u$ are set at 10 cm and 70 cm respectively.

The distance $t_z$, the distance of the translated wand's origin 105 from the camera 130 can then be approximated from the following formula:

$$t_z = z_l + ((z_u - z_l) \times (l_f - d_1)/(l_f - l_u))), \text{ if } d_1/d_2 \geq 1; \text{ or}$$

$$t_z = z_l + ((z_u - z_l) \times (l_1 - d_2)/(l_f - l_u))), \text{ if } d_1/d_2 < 1$$

With the present invention, tracking user movements of the wand 101 simply entails capturing the tracking points 110 in the image 300, determining their projected positions in the image 300, from which the essential parameters of the wand's position and orientation can be determined and then reconstructing the movement in the virtual environment concerned. This process is repeated at desired time intervals for as long as the present invention is in use.

It will be appreciated by one skilled in the art that there will be occasions in which the other objects such as the part of the user's body or the wand itself may mask one or more of the tracking points 110 from the line of sight of the camera 130, or there could be occasions where the spots in the image overlap. When this happens, a simple algorithm may not be able to accommodate such situations. To overcome this limitation, any driver software implementing this algorithm can be programmed to predict the intended trajectory or movement of the wand so as to ignore such situations and to resume processing when sufficient tracking points are detected again. With continual motion of the user's hand, such situations are not expected to occur with sufficient frequency to even cause any annoyance with users.

The minimum number of tracking points 110 to be captured in the image 300 for the preferred embodiment to operate is four. In the case when the camera 130 fails to capture this minimum number of tracking points 110 within a predetermined time intervals, the driver software would alert the user that an intolerable obscuration of the tracking points 110 has occurred.

Such situations may arise when the wand 101 is out of the field of view of the camera 130, or prolonged obscuration by some object or that power to the tracking points 110 is off. The pad 160 of FIG. 1 will help avoid such situations by reminding the user to keep the wand within the field of view of the camera.

The distances between the tracking points 110 have been carefully determined to minimize ambiguity when interpreting them on the images 300 captured by the camera 130 so that the position and orientation of the wand 101 can be rapidly reconstructed. It is also desirable to use small-size but high-power LEDs, which achieve a high brightness-to-spots' size ratio that would ensure high resolution and low likelihood of occurrence of spots' overlapping for reconstruction process.

Another possible way to reconstruct the position of the wand 101 from the relative positions of the tracking points 110 in the captured image 300 is by standard 3D reconstruction algorithms found in most textbooks on robotic vision and computer graphics techniques, as well as in some related prior patents. However such algorithms are computationally expensive and discourage real-time operations in typical computers. As such, implementation of such algorithms is also not desirable at the time of this application as it goes against the aim of the present invention of implementation in simple computing devices. As such, a lookup table, which is generated off-line, is used in the preferred embodiment to provide a fast response time at the expense of high precision in tracking. This tradeoff of accuracy for speed is desirable for gaming purpose.

Despite this, the elements of the present invention will still work with algorithms that reconstruct 3D movements when processor capabilities are able to accommodate such algorithms.

While a grayscale or color camera is usable under the present invention, cameras optimized to represent images using 1 bit per pixel (that is, in strict black and white representation) is preferred as data transmission requirements are minimized.

Figure 6:
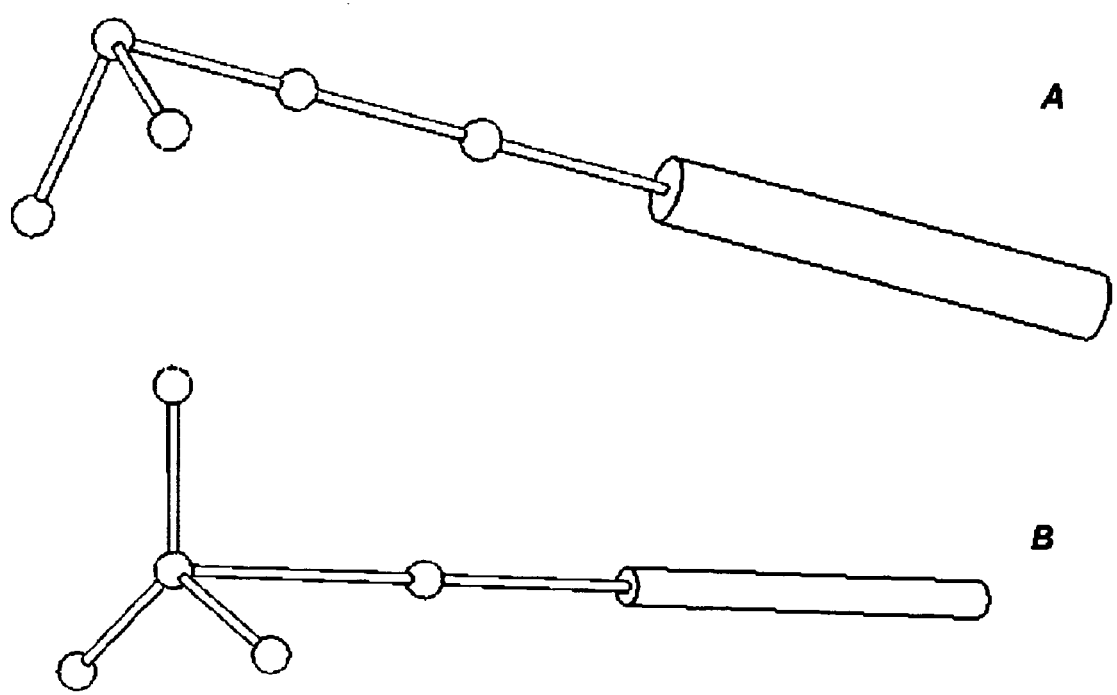
FIG. 6 shows two alternative embodiments of the wand of the present invention.

It will be appreciated by one skilled in the art that many embodiments are possible under the scope of the present invention. For example, the cross piece may be a V or L-shaped piece (FIG. 6A), equilateral triangle (FIG. 6B) or regular polygon. The present invention will work as long as the tracking points 110 of the cross piece all lie on a plane orthogonal to the longitudinal axis of the wand, and the appropriate reconstruction algorithm crafted for it.

Each tracking point 110 of the present invention may also emit or reflect different unique colors or wavelengths distinguishable by a color camera. In such an embodiment, speed and robustness of reconstruction of the wand's position may be greatly increased as it will be easier and faster and more certain in distinguishing the essential parameters of the wand's position. In this embodiment, the LED at each tracking point may be of distinctive color to better correspond its location in the image to that on the wand. The LEDs can also operate in pulsed mode, with camera's shuttle synchronized with the pulse rate, to achieve faster motion capture.

The present invention is also scalable, depending on the application. For example, a larger-size wand can be designed for full-body gaming platform. Other conventional control modules such as push buttons and joysticks can also be incorporated onto the handle 100 of the wand 101 to make the device a self-contained full controller eradicating the need for accessing the keyboard or mouse for total control of the interaction.

The sensitivity of the present invention can be increased, say for tracking a surgeon's hand, by bringing the camera nearer the wand or by using cameras with higher resolution.

Alternatively, more gross movements such as the swing of a modified racket, bat or club may be better captured by moving the camera further away. Capturing of images from these sports equipment may be done by placing tracking points on them or on representative simulated equipment.

As technology advances, the refresh rate for capturing the images and the sensitivity of tracking may also be enhanced as processor speeds and capabilities increase.

While the use of one camera has been described, it is possible to implement the present invention with more than one camera. If more than one camera are used, triangulation techniques may be used to better reconstruct the distance of wand from the cameras. The use of more cameras also has the advantage of improved obscuration-tolerance, such that the device would not stop operating if the wand is obscured from one camera. Such arrangement also has the advantage of better ambiguity-resolving, as in the situation when spots' overlapping occurs in one camera it will unlikely to occur in another camera if the relative placement of these cameras are carefully done.

It will be appreciated by one skilled in the art that the algorithm described can be readily implemented in a variety of programming languages at various levels from high level programming languages, to assembly languages to machine languages. The integration of the present invention to various gaming and CAD/CAM applications may also be readily performed by one skilled in the art.

The present invention therefore provides an input device comprising a wand with a cross piece, a camera, a processor and an algorithm and lookup table to allow users to overcome, or at least alleviate, the problems of the prior art.

Although in the preferred embodiment, the processor used is that of the computer to which the camera is connected to, a separate, dedicated processor for interpreting the captured images to obtain the position and orientation of the wand may also be used under the scope of the present invention.

In addition, while the present invention has capability to determine the 3D, 6 DOF input data, it will be apparent to one skilled in the art that the present invention can also be readily modified to track either 3DOF input data alone, as desired for other applications.

Figure 7:
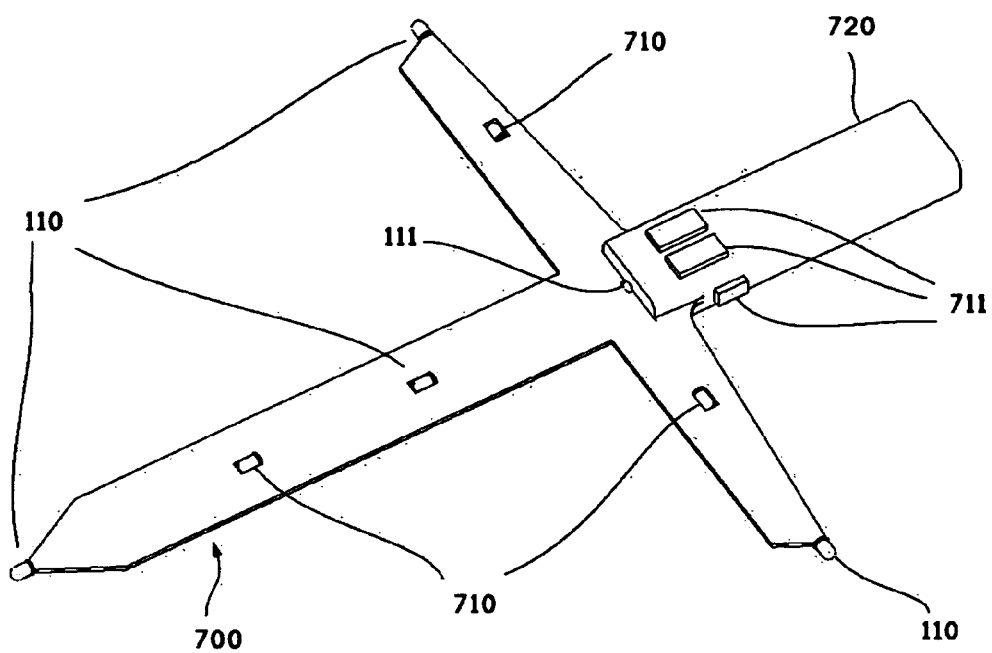
FIG. 7 shows a full-size tracker resembling the shape of a sword.

Alternatively, as illustrated in FIG. 7, the cross piece in the "T" configuration may be disposed near the handle 720 and forms an "inverted-T" configuration so that the tracker 700 could be in the shape of a sword. The algorithm described above can be easily modified to work with this "inverted-T" configuration. Additional LEDs 710 may be embedded along the two main axes defined by the tracking points 110 in tracker's body for indicating the states of the corresponding push buttons 711 on the handle 720.

Figure 8:
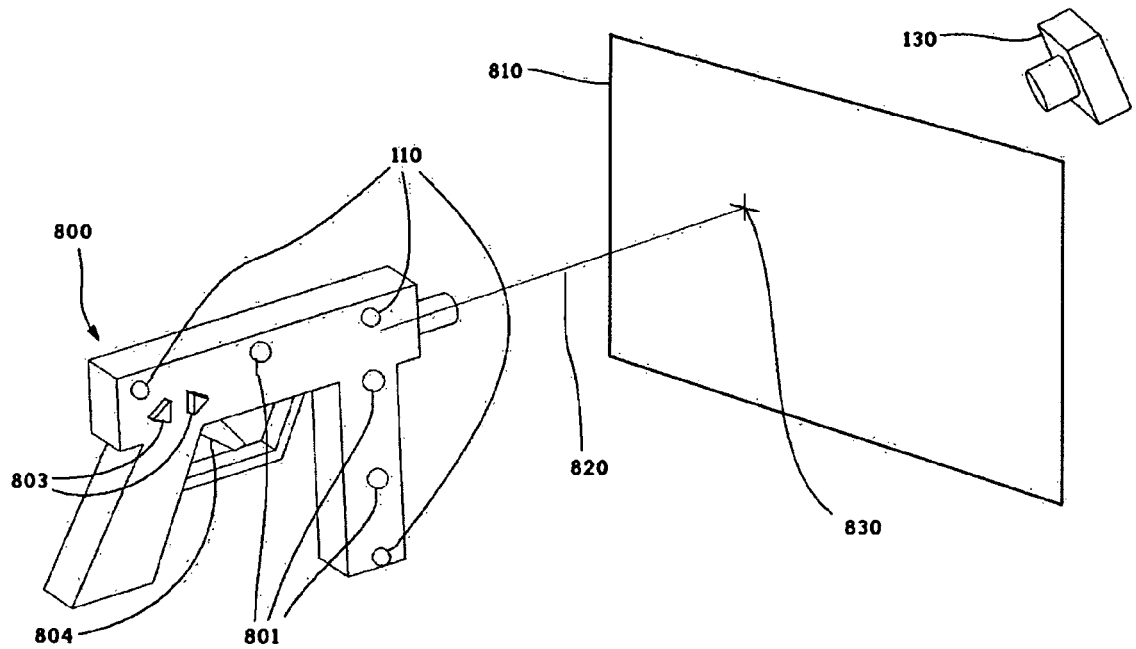
FIG. 8 shows a full-size tracker resembling the shape of a gun being used in shooting game.

The present invention could also be used for tracking a model gun's pointing direction in shooting games. As shown in FIG. 8, only three tracking points 110 would be required on the model gun 800 to achieve full 6-DOF hemispherical tracking for this application. This can be achieved due to the fact that the nominal set of operational pose of the gun is much smaller than those for sword or bat, and such additional prior knowledge of its operation can be used in the design of the algorithm to optimize the use of minimum tracking points. From these three tracking points, the accompanying algorithm would be able to determine the direction of the line-of-sight (LOS) 820 of the gun's barrel in three-dimensional space and hence the point-of-intercept 830 between the LOS and the two-dimensional segment on the display screen 810. Additional LEDs 801 for indicating the states of the control buttons 803 and trigger 804 may also be mounted along the two main axes defined by the three tracking points 110. This method of gun's tracking has many advantages over existing "GUNCON" tracking technology. The main advantage is that it can be utilized with all types of display hardware such as LCD, Plasma and projector monitors and not necessarily only with the CRT monitors. It also provides full 6-DOF tracking for additional locomotion controls, and its operation would not be degraded due to dim target display. There is also no need for complex hard wiring between the processor and the model gun.

Figure 9:
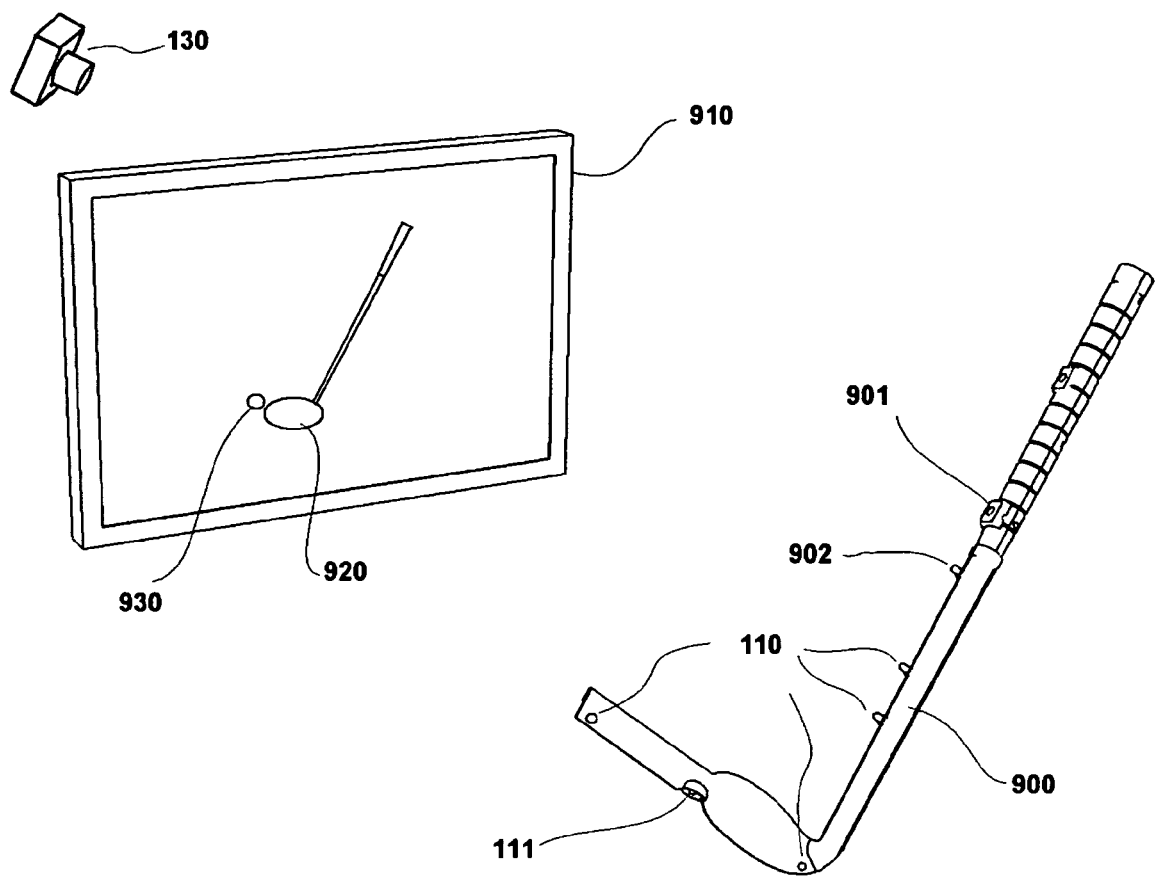
FIG. 9 shows a full-size tracker resembling the shape of a golf club being used in a golf simulation.

The present invention could also be used for tracking a model golf club in a golf simulator game. As shown in FIG. 9, the model golf club 900 consists of four always-ON tracking points 110 and a fifth orientation-specific tracking point 111, while the sixth tracking point 902 indicates the ON/OFF state of the push button 901. The tracking points 110 and 111 form an "L" configuration which is asymmetric along the roll direction of the tracker. The distances between the tracking points 110 and 111 are chosen based on whether their projected positions in the image can be unambiguously interpreted in the determination of the two axes. The pose of the club 900 is detected and used for the control of the virtual golf club 920 for hitting the virtual ball 930, both displayed in the monitor 910.

It will be appreciated that although one preferred embodiment has been described in detail, various modifications and improvements can be made by a person skilled in the art without departing from the scope of the present invention.

The invention claimed is:

1. An input device for providing three-dimensional, six-degrees-of-freedom data input to a computer, said device comprising:
    a wand comprising a reference spine oriented substantially parallel to the longitudinal axis of the wand and a cross piece oriented substantially orthogonal to the longitudinal axis of the wand, the reference spine and cross piece having a plurality of tracking points;
    wherein the position and orientation of the wand in three-dimensional space is determined from a two-dimensional image of the tracking points.

2. The device according to claim 1, wherein the two-dimensional image of the tracking points is captured by at least one image capturing device.

3. The device of claim 2, wherein at least one tracking point is embedded within a handle of the wand, wherein the presence of the at least one tracking point in the captured image is used to determine that the wand is oriented toward the image capturing device, and wherein the absence of the at least one tracking point in the captured image is used to determine that the wand is oriented away from the image capturing device.

4. The device of claim 2, further comprising a pad to estimate the field of view of the image capturing device.

5. The device according to claim 1, wherein a predetermined algorithm is used to determine the position and orientation of the input device in three-dimensional space.

6. The device of claim 5, wherein distances between the tracking points are selected such that ambiguity is avoided in the determination of the position and orientation of the wand by the predetermined algorithm.

7. The device of claim 1, wherein the tracking points comprise passive light reflectors and the input device further comprises at least one lighting means.

8. The device of claim 7, wherein said at least one lighting means is arranged in a ring co-axially disposed around the lens of the image capturing device.

9. The device of claim 1, wherein the tracking points comprise active light emitters.

10. The device of claim 9, wherein the tracking points comprise active light emitters for different wavelengths.

11. The device of claim 1, wherein the image capturing device further comprises at least one filter for selected wavelength range of light used.

12. The device of claim 1, further comprising at least one signaling point for indicating the state of control buttons housed in the wand.

13. The device of claim 1, wherein the cross piece is disposed in an orientation chosen from the group consisting of a symmetrical orientation relative to the longitudinal axis of the reference spine and an asymmetrical orientation relative to the longitudinal axis of the reference spine.

14. The device of claim 1, wherein the device is used for simulation in any one of group consisting of: golf, fishing, gun, sword fighting, racket, club and bat-swinging movements, CADCAM, animations, virtual training, surgical navigation, virtual artistry/music and digitising.

* * * * *